United States Patent Office 3,476,734
Patented Nov. 4, 1969

3,476,734
POLYMERIZATION OF ISOPRENE WITH CATALYST OF TRANSITION METAL AND POLYIMINOALANE
Walter Marconi, San Donato Milanese, Milan, Italy, assignor to SNAM S.p.A., Milan, Italy, a company of Italy
No Drawing. Continuation of application Ser. No. 494,873, Oct. 11, 1965. This application Nov. 8, 1968, Ser. No. 774,548
Claims priority, application Italy, Feb. 3, 1965, 889
The portion of the term of the patent subsequent to Sept. 16, 1986, has been disclaimed
Int. Cl. C08d $3/12, 1/14$
U.S. Cl. 260—94.3     1 Claim

ABSTRACT OF THE DISCLOSURE

Stereospecific polymers, and more particularly 1,4 cis polyisoprene, are obtained from conjugated dienes containing at least four carbon atoms in their molecule by using a catalytic system containing, in addition to a compound of a transition metal of the IV to VIII group of the periodic system, an aluminum polymeric compound of polyiminic nature having in its molecule repeating units of the type:

$$\begin{bmatrix} -Al-N- \\ | \quad | \\ H \quad R \end{bmatrix}$$

where R is an alkyl, aryl or cycloalkyl hydrocarbon radical. The polymerization is effected in an aliphatic hydrocarbon solvent at a temperature between $-30°$ C. and $100°$ C. and at a pressure between one and fifty atmospheres.

---

The present invention relates to a new catalytic system for stereospecific polymerization of conjugated dienes and to the polymerization process using said catalytic system.

The preparation of polydienes having high regularity of structure is well known using catalytic systems comprising transition metal compounds and alkyl aluminum compounds.

In particular it is possible to prepare for example, 1,4-cis polyisoprene with catalytic systems comprising $TiCl_4$ and trialkyl aluminum.

With the same catalytic systems and changing the compositions of the catalytic system components it is also possible to obtain 1,4-trans polyisoprene.

Since said catalytic systems contain alkyl aluminum compounds, they have a disadvantageous instability typical of these organometallic compounds, which are easily attacked by moisture, oxygen etc.

On the other hand, it must be considered that polyisoprene obtained in such a way rarely has high values of $[\eta]$, i.e. high molecular weights, which, if nothing else, makes it necessary to separate the low molecular weight polymers, which cannot be utilized for example in the tire industry.

We have now found that it is possible to obtain stereospecific polymers from conjugated dienes containing at least 4 carbon atoms in their molecule by using a catalytic system containing, in addition to the transition metal compound, an aluminum polymeric compound of polyiminic nature containing in its molecule repeating units of the type:

[--Al--N--]
    |    |
    H    R where R is an alkyl, aryl or cycloalkyl radical. Said compounds can be easily prepared by reacting $LiAlH_4$ with amine hydrochlorides or by reacting $AlH_3$ with primary amines:

(1)

$nR-NH_2 \cdot HCl + nLiAlH_4 \longrightarrow$

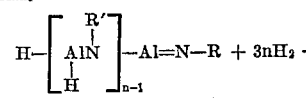

$H-\begin{bmatrix} R' \\ | \\ AlN \\ | \\ H \end{bmatrix}_{n-1} -Al=N-R + 3nH_2 + nLiCl$ (2)

$nAlH_3 \cdot NR_3 + nR'NH_2 \longrightarrow$

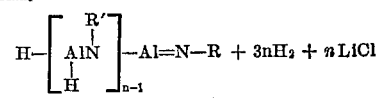

$H-\begin{bmatrix} R' \\ | \\ Al-N \\ | \\ H \end{bmatrix}_{n-1} -Al=N-R' + nNR_3 + 2nH_2$ where R and R', being the same or different, are chosen from hydrocarbon aryl, alkyl or cycloalkyl radicals such as, for example: $CH_3$, $C_2H_5$, $nC_4H_9$, $C_6H_6$. In the course of the description said compounds will be also termed aluminum iminic polymers. Said preparations are described by E. Wiberg, A. May in Z. f. Naturforsch, 10b, 232 (1955) and in particular by R. Ehrlich and coll. in Inorg. Chem. 3, 628 (1964). Molecular weight measurements show them to be polymers having $n>4$. When $n$ is small (from 4 to about 50), said compounds are soluble in aromatic and at times aliphatic solvents. Higher molecular weight polymers are insoluble in common solvents although they are still efficient as catalysts in the presence, for example, of $TiCl_4$, since they still contain an equivalent of active hydrogen for each aluminum atom.

Said compounds, principally in contrast to the alkyl aluminum compounds used in the traditional art, offer the advantage of a higher stability towards oxidizing and hydrolysing agents and better handling.

The use of said catalytic systems makes it possible, in particular, to obtain, from isoprene, polyisoprene having a high ratio of 1,4-cis units (higher than 92%).

Furthermore it has been found that operating under suitable conditions it is possible to obtain 1,4-cis polyisoprene having an intrinsic viscosity higher than 5, which corresponds to a viscosimetric molecular weight of about 1,500,000; said high molecular weight polyisoprene has the advantage of better mechanical properties in the vulcanized articles. The transition metal compound, which makes up the catalytic system together with the aluminum iminic polymer, can be selected from titanium tetrachloride, tetrabromide and tetraiodide, vanadium trichloride, zirconium tetrachloride, cobalt chloride, cobalt acetylacetonate; manganese chloride, nickel chloride and the like.

When the desired polydiene is 1,4-cis polyisoprene, the ratio between the aluminum gram atoms in the polyiminealuminum to gram atoms of transition metal must necessarily be in the range between 1.1 and 2.

The reaction can be carried out in inert hydrocarbon solvents, such as aromatic, aliphatic, cycloaliphatic hydrocarbons and mixtures thereof; in particular, if isoprene polymers having 1,4-cis structure and high molecular weight are to be obtained, the reaction is carired out in alipahtic hydrocarbon solvents, e.g. n-hexane, n-heptane, n-octane and the like.

Using said aliphatic solvents polymers are obtained having a high intrinsic viscosity, between 5 and 8, corresponding to a molecular weight of 1,500,000.

The catalytic system of the present invention can be formed in advance by interaction of the aluminum iminic polymer with the transition metal compound or it can be formed by interacting the two components of the catalytic system in the presence of the monomer to be polymerized.

Among the monomers which can be advantageously used are the conjugated dienes having in their molecules up to 12 carbon atoms, among them butadiene, isoprene, 1,3-pentadiene, 1,3-hexadiene, dimethyl-butadiene, phenyl-butadiene and the like can be mentioned.

The reaction can be carried out at temperatures between $-30°$ C. and $+100°$ C., and at pressures between atmospheric and 10 atmospheres.

The following examples are meant to illustrate the present invention without limiting it.

EXAMPLES 1-4

5 g. of $LiAlH_4$ (0.132 mole) and 130 cm.³ of anhydrous benzene are introduced into a two neck flask provided with a reflux cooler.

To the stirred suspension, 9.45 g. (0.116 mole) of ethylamine hydrochloride are added during about 30 minutes at room temperature. The mixture is continuously stirred at 50° C. for 16 hours and at room temperature for another 35 hours. The mixture is filtered under nitrogen to obtain a solution which when analysed gives the following results:

$Al=2.25$ g./100 cm.³, $N=133$ g./100 cm.³, $Cl=0.10$ g./100 cm.³, H(active)=1620 cm.³/100 cm.³ which correspond with a good approximation to an empirical formula:

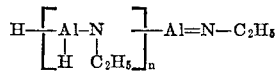

Such solution is called solution A.

We have carried out polymerization runs of isoprene with a catalyst obtained by mixing, in convenient ratios, solution A with a toluenic solution of $TiCl_4$. The polymerization runs have been carried out in 200 cm.³ capacity drinking bottles introducing successively: 100 cm.³ of anhydrous toluene, 1 cm.³ of a 1.82 molar toluenic solution of $TiCl_4$ and the desired quantity of solution A.

Mixing was carried out while stirring and in an inert gas atmosphere. The bottle was then closed with a neoprene plug and a bored crown metal cap, through which 30 cm.³ of isoprene were introduced by means of a hypodermic syringe.

The bottle was kept in a thermostatic bath at $+15°$ C. for the desired time.

At the end, methanol was added together with an antioxidizer and the polymer coagulated and washed at length. Finally it was dried at 45° C. under vacuum until constant weight was reached. On the dry polymer, the yield was calculated and the IR analysis performed; and the intrinsic viscosity in toluene at 30° C. measured.

The same procedure was followed for all the described polymerization runs.

The results obtained in isoprene polymerization using the aluminum ethyl-iminic polymer and different Al/Ti ratios are shown in Table 1.

TABLE 1[a]

| $\left[\begin{array}{c}H\\-Al-N-\\|\\C_2H_5\end{array}\right]_n$ (Solution A) cc. | Molar ratio, Al/Ti | Polymerization time (hrs.) | Solid polymer yield, percent g. | IR Analysis | | | | Total unsaturation, percent | $[\eta]$ |
|---|---|---|---|---|---|---|---|---|---|
| | | | | 1,4-cis, percent | 1,4-trans, percent | 3,4, percent | 1,2, percent | | |
| Run No.: | | | | | | | | | |
| 1 | 3.07 | 1.4 | 2 | 47 | 95 | 0.5 | 4 | 0.5 | 95.5 | 4.15 |
| 2 | 3.3 | 1.5 | 2 | 63.7 | 94 | 1.5 | 4 | 0.5 | 95 | 3.59 |
| 3 | 3.4 | 1.55 | 2 | 59 | 95 | 0.5 | 4 | 0.5 | 95 | 4.12 |
| 4 | 3.5 | 1.6 | 2 | 45 | 95 | 0 | 4.5 | 0.5 | 96 | 2.65 |

[a] $TiCl_4$ 1.82 mmoles, Toluene 100 cm.³, Isoprene 30 cm.³, Polymerization temperature $+15°$ C.

EXAMPLES 5-9

Into a 500 cm.³ two neck flask provided with reflux cooler and magnetic stirrer, 8.2 g. (0.216 mole) of $LiAlH_4$ and 200 cm.³ of anhydrous toluene are introduced. To this suspension 17.7 g. (0.195 mole) of n-butylamine hydrochloride are added for about 45 minutes. The mixture is stirred at 50–55° C. for 3 hours, then at room temperature for another 70 hours. The mixture is then filtered and the clear solution concentrated under vacuum at room temperature to about ⅔ of its initial volume and this is analysed:

$Al=2.58$ g./100 cm.³; $N=1.40$ g./100 cm.³; H(active)=2558 cm.³/100 cm.³; Cl=none.

The analysis corresponds with good approximation to the empirical formula:

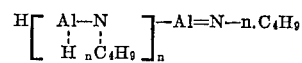

This solution is called solution B.

Following the above mentioned procedure, polymerization runs in toluene and n-heptane were carried out, the results of which are shown in Table 2.

TABLE 2[b]

| $\left[\begin{array}{cc}H & nC_4H_9\\|&|\\-Al-N-\end{array}\right]_n$ (Solution B) cm.³ | Molar ratio, Al/Ti | Polymerization solvent | Polymerization time, hrs. | Solid polymer yield, percent g. | IR Analysis | | | | Total unsat. percent | $[\eta]$ |
|---|---|---|---|---|---|---|---|---|---|---|
| | | | | | 1,4-cis, percent | 1,4-trans, percent | 3,4, percent | 1,2, percent | | |
| Run No.: | | | | | | | | | | |
| 5 | 2.2 | 1.1 | Toluene | 2 | 61.5 | 95.5 | 0 | 4 | 0.5 | 96 | 3.5 |
| 6 | 2.31 | 1.2 | do | 2 | 36.3 | 95.5 | 0 | 4 | 0.5 | 96 | 2.63 |
| 7 | 2.31 | 1.2 | n-Heptane | 16 | 73 | 96.5 | 0 | 3.5 | 0 | 94 | 5.29 |
| 8 | 2.5 | 1.3 | do | 16 | 85 | 96.5 | 0 | 3.5 | 0 | 95 | 6.08 |
| 9 | 2.7 | 1.4 | do | 16 | 68.2 | 96 | 0 | 4 | 0 | 93 | 5.15 |

[b] $TiCl_4$ 1.82 mmoles, solvent 100 cm.³, isoprene 30 cm.³, polymerization temperature $+15°$ C.

EXAMPLES 10-11

Into a 500 cm.³ two neck flask provided with reflux cooler and magnetic stirrer, 7.1 g. of $LiAlH_4$ (0.187 mole) and 170 cm.³ of toluene are charged. To this suspension 13.1 g. (0.168 mole) of aniline hydrochloride are added during 30 minutes. The mixture is stirred at room temperature for 75 hours and finally heated to 50–55° C. for 8 hours. The mixture was filtered; and 20% of its initial volume is carried off by concentrating under vacuum.

Analysis is carried out on the obtained clear solution. The results are: $Al=0.719$ g./100 cm.³ and also $$\frac{\text{g. atoms H}}{\text{g. atoms Al}}=1.2, \quad \frac{\text{g. atoms N}}{\text{g. atoms Al}}=1.17$$

Cl=none, which correspond with good approximation to an empirical formula:

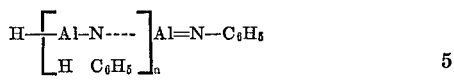

This solution is called solution C.

Results of isoprene polymerization runs with the aluminum phenyliminic polymer and TiCl₄, carried out following the above outlined procedures, are shown in Table 3.

wherein
R is an alkyl, aryl, or cycloalkyl radical, and
$n$ is $\geq 4$ in a hydrocarbon solvent, wherein the ratio between said polyiminoalane and the said compound of a transition metal is between 1.1 and 2, and carrying out the polymerization reaction at temperatures between −30 and +100° C. and at pressures between 1 and 50 atm. so that a polymer is obtained having a 1,2 units content which is lower than 1%.

TABLE 3 ᵃ

| | $\left[\begin{array}{cc} H & C_6H_5 \\ \mid & \mid \\ -Al-N- \end{array}\right]_n$ (Solution C) cm.³ | Molar ratio, Al/Ti | Solid polymer yield, percent g. | IR Analysis | | | | Total unsaturation, percent | [η] |
|---|---|---|---|---|---|---|---|---|---|
| | | | | 1,4-cis, percent | 1,4-trans, percent | 3,4, percent | 1,2, percent | | |
| Run No.: | | | | | | | | | |
| 10 | 8.56 | 1.2 | 57.4 | 95.5 | 0 | 4.5 | 0 | 91 | 4.22 |
| 11 | 9.3 | 1.3 | 71 | 95.5 | 0 | 4 | 0.5 | 97 | 2.61 |

ᵃ TiCl₄ 1.82 mmoles, Toluene 100 cm.³, Isoprene 30 cm.³, polymerization temperature +15° C., polymerization time 2 hrs.

What we claim is:
1. A process for polymerizing isoprene to substantially 1,4 cis polyisoprene comprising contacting isoprene with a catalyst system obtained by combining:
  a compound of a transition metal selected from the group consisting of titanium tetrachloride, titanium tetrabromide, titanium tetraiodide, vanadium trichloride, zirconium tetrachloride, cobalt chloride, cobalt acetylacetonate, manganese chloride and nickel chloride and
  a polyiminoalane represented by the formula:

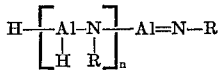

References Cited

UNITED STATES PATENTS

| | | | |
|---|---|---|---|
| 2,694,053 | 11/1954 | Uraresh et al. | 260—94.6 |
| 3,165,503 | 1/1965 | Kahn et al. | 260—94.3 |
| 3,255,169 | 6/1966 | Kearly | 260—94.6 |
| 3,163,611 | 12/1964 | Anderson et al. | 250—429 |
| 3,245,976 | 4/1966 | Marconi et al. | 260—94.3 |

OTHER REFERENCES

The Chemistry of Alane, Polyiminoalanes by Ehrlich et al., Inorganic Chemistry, vol. 3, No. 5, May 1964.

JOSEPH L. SCHOFER, Primary Examiner

W. F. HAMROCK, Assistant Examiner

U.S. Cl. X.R.

252—429; 260—93.5, 94.6